United States Patent

[11] 3,570,656

[72] Inventor Peter J. Manetta
 Warren, Mich.
[21] Appl. No. 480
[22] Filed Jan. 2, 1970
 Continuation of Ser. No. 578,094, Sept. 8, 1966, abandoned.
[45] Patented Mar. 16, 1971
[73] Assignee Simplex Corporation
 Detroit, Mich.

[54] ACCUMULATING FEED SYSTEM
 33 Claims, 7 Drawing Figs.
[52] U.S. Cl. .................................................. 198/221
[51] Int. Cl. ..................................................... B65g 25/08

[50] Field of Search .............................................. 198/19,
 218, 219, 221, 34

[56] References Cited
UNITED STATES PATENTS
3,322,259 5/1967 Milazzo ........................ 198/219
3,369,650 2/1968 Caretto ........................ 198/219

Primary Examiner—Edward A. Sroka
Attorney—Whittemore, Hulbert and Belknap

ABSTRACT: A system for advancing a series of articles through a series of stations including means for insuring advance of every article in the system to the rear of the foremost vacant station therein.

PATENTED MAR 16 1971

INVENTOR
PETER J. MANETTA
BY Whittemore
Hulbert & Belknap
ATTORNEY

ACCUMULATING FEED SYSTEM

CROSS-REFERENCE TO RELATED APPLICATION

The present application is a continuation of my prior copending application Ser. No. 578,094, filed Sept. 8, 1966, now abandoned.

SUMMARY OF THE INVENTION

The invention comprises a series of spaced stations, means at each station for sensing the presence or absence of a workpiece, a dog movable between idle and feeding positions relative to each station except the delivery station, means for moving the dogs to cause each dog to traverse a station and if in feed position, to advance a workpiece to the next station. The foremost station in the direction of advance of the workpieces advanced from the next preceding station. Accordingly, a workpiece may be advanced from every station in rear of the foremost empty station. The means for accomplishing this is a series of mechanically engaging independently movable elements having two limiting positions and one-way engagement with each other so that if one intermediate element is moved from one limiting position to the other position, all of the elements in the direction of movement are caused to be similarly moved, unless they already occupy the position to which the one element was moved.

With this arrangement, where the position of each independently movable element is determinative of the position of a feed dog, movement of the dog at the station in rear of the foremost empty station to feed position will cause all dogs rearwardly thereof to occupy a feed position. Accordingly, the next succeeding forward feeding movement of the dogs will advance all workpieces to the rear of the foremost vacant station.

It is an object of the present invention to provide a feed system comprising a longitudinally arranged series of work supporting stations including a starting station at which workpieces are deposited serially, and a delivery station from which workpieces are removed serially, together with transfer mechanism for advancing all of the articles one station whenever the article at the delivery station is removed, and operable also to advance all of the articles in rear of an intermediate empty station by one station so as to maintain all of the stations in filled condition.

It is a further object of the present invention to provide a system of the character described comprising a succession of stations, sensing means at each station to determine empty stations, transfer means including feed members at each station, and control means responsive to the sensing means effective to control the individual feed members so as to avoid advancing a workpiece to an occupied station while at the same time advancing a workpiece in rear of an empty station.

It is a further object of the present invention to provide a system as described in the foregoing in which all of the mechanism is trouble-free mechanical mechanism.

Other objects and features of the invention will become apparent as the description proceeds, especially when taken in conjunction with the accompanying drawings, illustrating a preferred embodiment of the invention.

DETAILED DESCRIPTION

Figure 1:
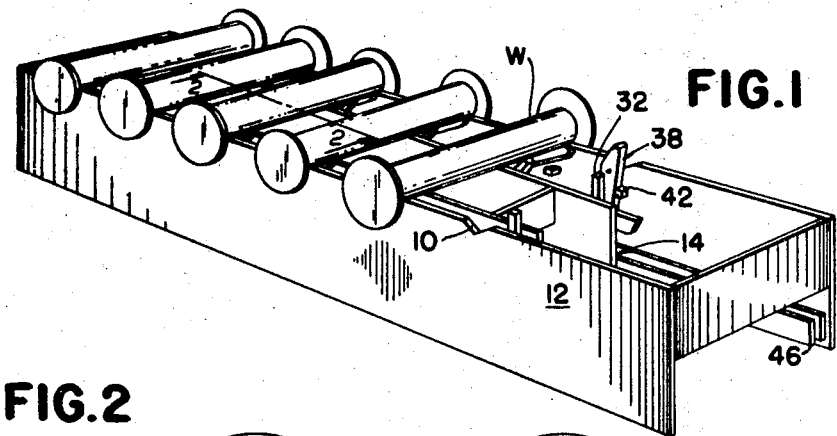
FIG. 1 is a fragmentary perspective view of the starting end of the feed system.

The system comprises means providing a longitudinally spaced series of stations. In a simple form these stations are provided by pairs of notches 10 provided in elongated frame members 12 and each aligned pair of notches is adapted to hold a work piece W in the relationship shown in FIG. 1. The work pieces for example may be automobile axles and the system is designed for maintaining a supply of axles in readiness for assembly, for advancing all of the workpieces or axles from station to station when a workpiece is removed from the final or delivery station, and for advancing all of the workpieces in rear of any empty intermediate station even when the final or delivery station is occupied. It sometimes happens that for one reason or another one or more of the workpieces at intermediate stations are removed. In this case the system operates automatically to advance all of the workpieces in rear of the foremost empty station until all stations are filled, it being assumed of course that workpieces are supplied to the loading or starting station whenever it becomes empty as a result of advance of a workpiece therefrom.

In accordance with the present invention the means for advancing the workpieces, and the means for sensing whether or not each of the stations is empty, are purely mechanical and hence not subject to potential failures inherent in electrical or fluid operated systems.

Mounted for longitudinal reciprocatory movement between the frame members 12 is a feed carrier or transfer slide 14 composed of a pair of plates 16 interconnected by cross members 18. The slide 14 is longitudinally slidable on rails 20 and is supported on the rails against lateral movement by guide plates 22.

Figure 5:
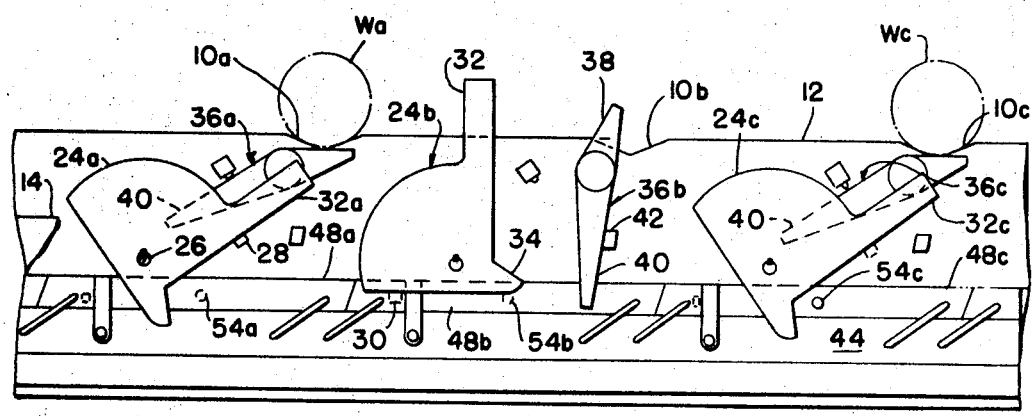
FIGS. 5—7 are somewhat diagrammatic elevational views showing the operating relationship of parts.

Carried by the transfer slide 14 and spaced therealong at intervals equal to the spacing between the notches or recesses 10 are work feed devices in the form of pairs of feed dogs or levers 24 which are interconnected for simultaneous swinging movement by cross shafts 26. The feed dogs 24, as is best apparent in FIG. 5, are shaped and arranged so that they are biased by gravity either to the positions shown at the right and left in FIG. 5, or to the position occupied by the dog located centrally of FIG. 5. It will be observed in this FIG. that when the dogs are pivoted clockwise their rest position is determined by engagement with stops 28 and when they are rotated counterclockwise to the limiting position as shown at the center of FIG. 5 their position is determined by the stops 30. The intermediate position illustrated in FIG. 5 is the activated or feeding position and each of the dogs includes the feeding extension 32 which is engageable with a portion of the work piece W to push it to the right as seen in FIG. 5, under appropriate conditions. In addition, each of the dogs 24 includes a forwardly extending toe 34 for a purpose which will presently be explained. It will be understood that in the position of the dogs shown at the right and left of FIG. 5, gravity tends to rotate the dogs clockwise. Conversely, when the dog is in the feed position shown at the center of FIG. 5, gravity biases the dog counterclockwise. Thus, an overcenter device is provided.

Carried by one of the frame members 12 adjacent each of the notches 10 is a sensing lever 36 having an upper portion 38 engageable by a workpiece W when the recess or notch 10 receives a workpiece as seen at the right in FIG. 5. The sensing lever 36 includes a lower actuating portion 40 engageable against a fixed stop 42 carried by one of the frame members 12 for a purpose which will subsequently be explained.

Associated with the feed dogs 24 carried by one of the members 12 is a control bar 44 which is mounted for longitudinal reciprocation between a pair of guide plates 46. Connected to the control bar 44 are a series of relatively movable control members 48. Each of these members is elongated and is pivotally connected adjacent its ends to the control bar 44 by a pair of links 50. With this arrangement each of the members 48 is movable generally upwardly and counterclockwise under conditions which will subsequently be described. It will further be observed that the ends of the individual members 48 are normally in abutment, the ends being inclined as shown at 52.

Figure 6:
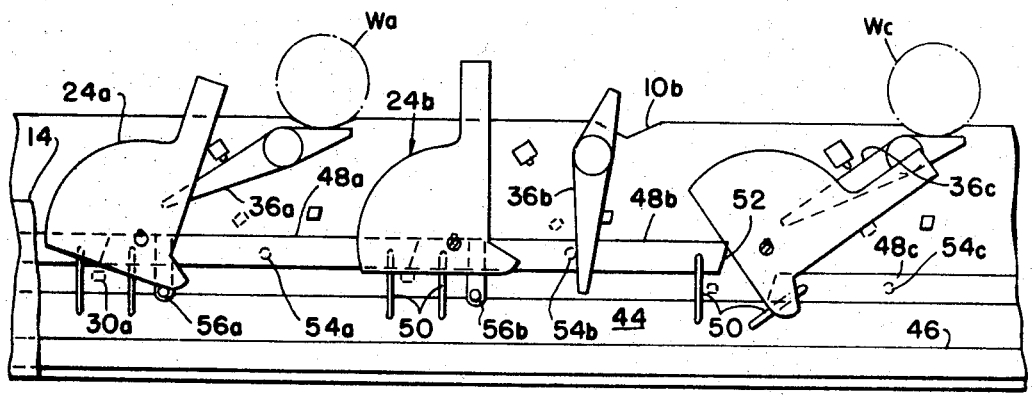

As best seen in FIG. 6 upward and leftward swinging movement of any individual member 48 results in like upward and leftward swinging movement of every control member toward the starting end of the transfer system. Thus, if the control member at the delivery end is swung upwardly and toward the rear, all of the control members in the system are swung upwardly and toward the rear.

Extending laterally from each of the separately movable elongated control members 48 is a pin 54 and these pins are in position to engage the depending portion 40 of the sensing lever 36 when the control bar 44 is moved forwardly or to the right as seen in the elevational views. It will be appreciated that engagement between the pins 54 and the depending portion 40 of a sensing lever 36 will cause the elongated control member 48 to move upwardly as the control bar 44 moves to the right, this motion of course taking place about the lower pivots of the pivot links 50.

Also carried by each individual control member 48 is an actuating pin 56, these pins being carried by depending straps 58. As best seen in FIG. 6 one of the pins 56 is engageable with the nose 34 of an associated feed dog 24 so as to swing the dog counterclockwise to raise the upper portion 32 thereof into position to engage a workpiece.

It will be observed in FIGS. 1—4 that the levers 24 are provided in pairs, while only one control bar 44 provided with the individually movable elongated control members 48 is provided, and further, that the sensing levers 36 are provided at only one side of the system. Accordingly, the feed dogs 24 are rigidly connected to transverse shafts 26 so that when one of the dogs is tilted to either limiting position the companion dog is movable therewith.

Figure 7:
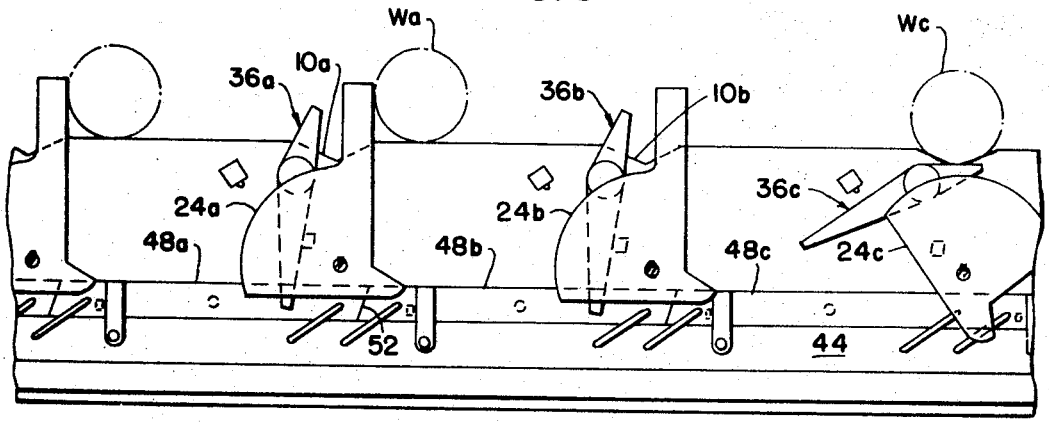

With the foregoing description of the construction, reference is now made to FIGS. 5—7 for a complete description of the operation. In these FIGS. the individual parts are given identical reference characters but are distinguished by letters for simplification. In FIG. 5 there are illustrated three stations designated from left to right as 10a, 10b and 10c. Associated with each station are the individually movable sensing levers 36a, 36b and 36c. Associated with each of the three stations are feed dogs designated respectively 24a, 24b and 24c. Also, the control bar 44 is illustrated in the FIGS. as having the three individually movable elongated control members 48a, 48b and 48c. In FIG. 5 it will be observed that workpieces Wa and Wc are provided at stations 10b. Accordingly, it will be observed that at stations 10a and 10c the sensing levers have been engaged by the workpieces and the lower control portions 40 thereof have been rocked counterclockwise and upwardly into positions in which they will not be engaged by the pins 54a or 54c. On the other hand, at the station 10b where no workpiece is present, the sensing lever 36b has the lower portion 40 extending downwardly into the path of the pin 54b. The parts illustrated in FIG. 5 are in the position corresponding to leftward movement of the transfer slide 14 so that feed dogs 24a and 24c have been rocked over about their pivot mountings to the feed slide to the inoperative position shown by engagement with the upper portions 32a and 32c thereof with the workpieces Wa and Wc. On the other hand, the feed dog 24b which has traversed the empty station 10b, has not been rocked over to its inactive position and remains in its operative position where it would be capable of feeding a workpiece from the station 10b to the station 10c. However, since there is no workpiece at the station 10b, the position of the feed dog 24b is immaterial. In the illustrated position it is assumed that there are no vacant stations to the right of the station 10c and accordingly, the problem is to advance the workpiece Wa to the station 10b and to advance all of the workpieces to the left of the station 10a by an amount equal to the distance between adjacent stations. Accordingly, the position of feed dog 24a illustrated in FIG. 5 is incorrect and has to be changed before the next forward or feeding movement of the transfer slide 14.

This is accomplished as illustrated in FIG. 5 by a predetermined forward movement of the control bar 44. It will be observed that this forward movement of the control bar, which is to the right in FIG. 5, has no effect on the control member 48c since the sensing lever 36c is swung to the inclined position where the pin 54c clears the sensing lever 36c. On the other hand, at the vacant station 10b the depending portion of the sensing lever 36b is in position to intercept the pin 54b on forward movement of the control bar 44 and this will have the result of swinging the member 48b about the links 50 relative to the control bar 44. Actually, the movement of the pin 54b as a result of this movement is directly upwardly along the vertical surface of the lower portion of the sensing lever 36b. This upward movement of the member 48b will move the actuating pin 56b upwardly which would have the effect of swinging the feed dog 24b to the illustrated position if for any reason it were not already in such position. However, the important operation at this time is that the control member 48a is swung upwardly and to the left about its pivot links 50 so that the pin 56a carried thereby engages the nose of the feed dog 24a and swings the feed dog to the position illustrated in FIG. 6. Actually, since the feed dogs are overcenter dogs as has been previously described, movement of the feed dog 24a to the illustrated position by the pin 56a is followed by further movement of the feed dog into engagement with its associated stop 30a.

As soon as the control bar 44 has effected the movement of the required dogs to operating position, the control bar 44 returns to the left to its initial position and the transfer slide 14 is moved to the right as seen in the FIGS. by a distance sufficient to cause each of the operative feed dogs to advance a workpiece from one station to the next succeeding station. In FIG. 7 the parts are in a position corresponding to an intermediate position of the feed slide and the feed dog 24a is advancing the workpiece Wa from station 10a toward the station 10b. The feed dog 24b is performing no function since it is merely traversing the empty station 10b. The feed dog 24c remains in its inactivated idle position and passes beneath the workpiece Wc because there are no vacant stations ahead of the workpiece Wc.

In operation the control bar 44 and the transfer slide 14 may be reciprocated continuously by conventional actuators at intervals of a few seconds, as for example, every four seconds. The stroke of the control bar 44 is of course only sufficient to provide proper actuation of the feed dogs while the stroke of the transfer slide 14 is sufficient to advance a workpiece from one station to the next successive station. Whenever all of the stations are filled with workpieces, all of the dogs are moved downwardly from any upright position which they may have assumed and will remain in the downward or idle position since none of the individually movable control members 48 will be moved upwardly upon forward movement of the control bar. On the other hand, when the single workpiece at the delivery station is removed and if all of the remaining stations are filled, all of the feed dogs are knocked down upon reverse movement of the feed slide and are then raised by engagement with the pins 56 so that every workpiece is advanced one station, filling the delivery station and leaving the starting station empty, and of course a new workpiece will be supplied to the starting station at this time. Therefore, so long as the accumulating supply system remains filled, the mechanism will reciprocate back and forth idly without performing any function. If however, a workpiece is removed from the delivery station or from any intermediate station, or if several workpieces are removed from any stations, then the accumulating system operates to fill up all stations from the delivery station rearwardly.

Figure 2:
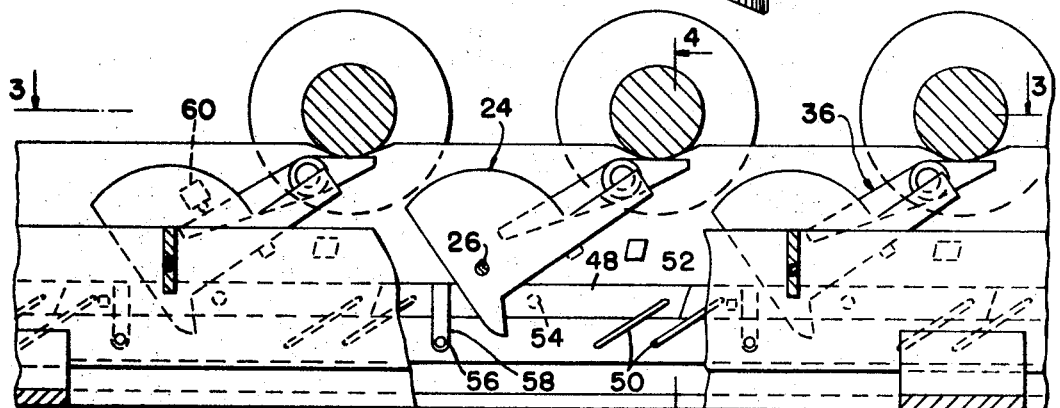
FIG. 2 is an enlarged fragmentary elevation with parts broken away, taken substantially on the line 2—2, FIG. 1.
Figure 3:
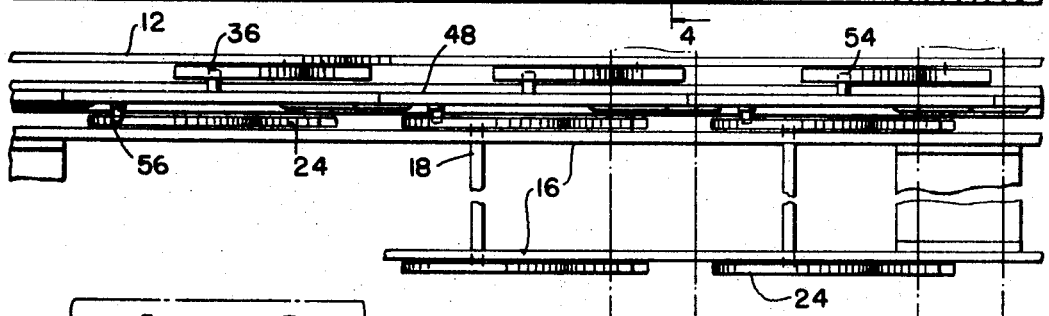
FIG. 3 is a plan view of the portion of the system seen in FIG. 1.
Figure 4:
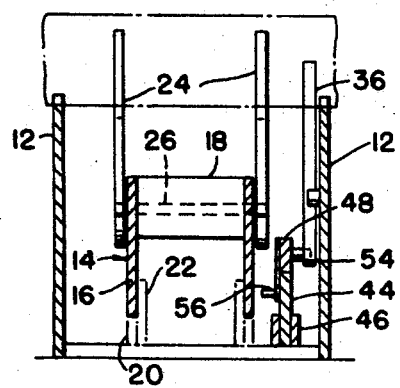
FIG. 4 is an end view of the system.

Instead of permitting the control bar and transfer slide to reciprocate idly it is of course possible to provide a switch at each station such as the switch indicated at 60 in FIG. 2. With this arrangement all of the switches 60 may be connected into a circuit such that when all of the switches are engaged by the adjacent sensing levers 36 then reciprocation of the control bar and transfer slide is terminated until such time as one of the workpieces is removed.

Since all of the operating parts of the system are mechanical, the system is substantially trouble-free.

I claim:

1. An accumulating feed system comprising a series of work supporting stations including a starting station at which workpieces are deposited serially, a delivery station from which workpieces are removed serially, and a plurality of uniformly spaced intermediate stations through which workpieces are advanced intermittently, sensing means associated with each of said stations, said sensing means having first and second positions corresponding respectively to the presence and absence of a workpiece at the associated station, a transfer slide extending along said series of stations, feed members movable connected to said transfer slide for movement thereon between an operating position in which each feed member is engageable with a workpiece and operable upon forward movement of said transfer slide to advance a workpiece from one station to the next station and an idle position in which the feed member moves past the adjacent workpiece without engaging it, means for moving said transfer slide in forward and reverse strokes at least equal to the spacing between work stations, a control bar extending along said transfer slide and series of stations, independently movable devices carried by said control bar each of which has means mechanically engageable with its associated sensing means when the sensing means is in its second or empty position, a feed member actuator operable by each of said devices, means for moving said control bar in forward and reverse strokes to cause each of the movable devices thereon to traverse the position occupied by the associated sensing means to cause the movable device traversing the foremost empty station to engage the sensing means in its second position thereat to move the device relative to said program bar and to move the associated actuator into mechanical engagement with the associated feed member and to shift the feed member if in idle position into feed position, said independently movable devices comprising a longitudinally extending series of independently movable members, the means mechanically engageable with said sensing means being carried by said independently movable members, said independently movable members having one-way engagement with each other and each being movable in one sense if in a position corresponding to idle position of the associated feed member to the position corresponding to feed position of the associated feed member upon movement of the associated movable member as a consequence of engagement by the means carried by said associated movable member with the associated sensing means in its second or empty position, the one-way engagement between said movable members being effective to insure that upon movement of the foremost feed member into feed position, all feed members located rearwardly of said foremost feed members located rearwardly of said foremost feed member is in idle position, are moved to feed position.

2. A system as defined in claim 1 in which said feed members comprise pivoted levers.

3. A system as defined in claim 2 in which said movable members are independently pivotally connected to said control bar.

4. A system as defined in claim 2 in which said feed members are shaped to be biased by gravity to either limiting position.

5. A system as defined in claim 1 in which said independently movable members are included in said devices to insure that all devices in rear of the foremost device moved to feed member actuating position are also moved to feed member actuating position.

6. A system as defined in claim 5 in which said sensing means comprise arms which when the associated station is empty, move into fixed positions and constitute rigid abutments engageable by the means carried by said movable members.

7. A system as defined in claim 5 in which said movable members are independently pivotally connected to said control bar.

8. A system as defined in claim 7 in which each of said movable members has one-way abutment surfaces thereon spaced from the pivot connections to said control bar engageable with abutment surfaces on the adjacent movable member.

9. A system as defined in claim 8 in which said movable members are in the form of elongated bar segments having the abutment surfaces adjacent the ends thereof.

10. A system as defined in claim 9, in which each bar segment is connected to said control bar by parallel links.

11. An accumulating feed system comprising a longitudinally arranged series of work supporting stations including a starting station at which workpieces are deposited serially, a delivery station from which workpieces are removed serially, and a plurality of intermediate stations through which workpieces are advanced intermittently and from which individual workpieces may be removed, sensing means associated with each station except the discharge station operable to advance a workpiece from its station to the next successive station, and control means responsive to the sensing of the absence of a workpiece at the delivery or any intermediate station to activate the feed means of every station in rear of the empty station simultaneously to advance a workpiece to the next successive station, the sensing means and the control means both being mechanical means, a feed member movable when activated to feed position to advance a workpiece from one station to the next successive station, means for moving all of said feed members simultaneously in forward feeding strokes, said feed members comprising overcenter feed levers having activated feed positions in which they are movable in paths to engage workpieces, and inactivated idle positions in which when advanced they clear the adjacent workpieces, said levers being engageable with workpieces immediately to the rear thereof on the return stroke to move the levers to inactivated positions, said control means comprising a control bar reciprocable longitudinally of said series of stations, individual control members carried by said control bar and selectively operable by said sensing means to restore each of said levers to activated position, and interlock means operable to cause all of said members to the rear of the foremost member operated by said sensing means as a result of sensing an empty station to move the levers associated therewith to activated positions, said feeding stations being provided by a pair of rails having recesses at each station, said feed means comprising a transfer slide movable forwardly and rearwardly in feed and return strokes slightly greater than the spacing of stations along said rails, said sensing means comprising sensing levers engageable by workpieces at said stations and movable thereby to inoperative positions, and said members being pivoted to said control bar and having means thereon engageable with a sensing lever at any empty station, said members being in engagement whereby movement of any one member by a sensing lever causes like movement of every control member to the rear thereof.

12. A system as defined in claim 11 in which each of said control members has means thereon mechanically engageable with the associated feed member to restore it to feed position.

13. An accumulating feed system comprising a longitudinally arranged series of work supporting stations including a starting station at which workpieces are deposited serially, a delivery station from which workpieces are removed serially, and a plurality of intermediate stations through which workpieces are advanced intermittently and from which individual workpieces may be removed, sensing means associated with said stations to determine empty stations, feed means associated with each station except the discharge station operable to advance a workpiece from its station to the next successive station, and control means responsive to the sensing of the absence of a workpiece at the delivery or any intermediate station to activate the feed means of every station in rear of the empty station to simultaneously advance a workpiece to the next successive station, said control means comprising a series of individual separately movable elements, all of said elements being movable relative to a support in the same sense, and abutment means acting between said elements effective to ensure identical movement of all elements located in one direction from a particular element upon movement of such particular element, while the elements located in the opposite direction are not moved.

14. An accumulating feed system comprising a longitudinally arranged series of work supporting stations including a starting station at which workpieces are deposited axially, a delivery station from which workpieces are removed serially, and a plurality of intermediate stations through which workpieces are advanced intermittently and from which individual workpieces may be removed, sensing means associated with said stations to determine empty stations, feed means associated with each station except the discharge station operable to advance a workpiece from its station to the next successive station, and control means responsive to the sensing of the absence of a workpiece at the delivery or any intermediate station to activate the feed means of every station in rear of the empty station to simultaneously advance a workpiece to the next successive station, said control means comprising an elongated support, a segmental bar composed of elongated normally end-abutting segments pivoted to said support, said sensing means being operable to pivot a particular one, including an intermediate one of said segments relative to said support, pivotal movement of any of said segments by said sensing means being transmitted to all segments located in the direction toward which said particular segment swings.

15. A system as defined in claim 14, said segments each being pivoted to said support by parallel links.

16. A system as defined in claim 15, means for reciprocating said support and said sensing means comprising abutment means movable into operative engagement with any one or more of said segments.

17. Control means comprising a reciprocable elongated support, a series of elements movably mounted on said support, abutment means acting between each adjacent pair of elements, sensing means for each of said elements comprising an abutment movable into the path said element traverses upon reciprocation of said support and operable to move the particular associated element relative to said support, the abutment means acting between adjacent pairs of elements being effective to cause corresponding movement of all elements in the series located in one direction from the particular element.

18. Structure as defined in claim 17 in which said elements are elongated parallel normally aligned elements, parallel links pivoting each of said elements to said support, said elements being in end-abutment such that movement of any element swings such element away from one adjacent element and imparts like swinging movement to the remaining adjacent element and all elements therebeyond.

19. Structure as defined in claim 17 in which the abutment means acting between adjacent pairs of elements are active in one direction only so that when all elements are in like position and an intermediate one of said elements is moved in one direction, it will move away from one adjacent element and impart like movement to the other adjacent element and all elements therebeyond.

20. Structure as defined in claim 17 in which said elements are elongated parallel normally aligned elements in end abutment, guide means for each of said elements effective upon movement of one intermediate element in one direction to maintain the ends of all elements in the direction of movement of said one element in abutment.

21. An accumulating feed system comprising:
a series of work support stations including a starting station at which workpieces are deposited serially, a delivery station from which workpieces are removed serially, and a plurality of intermediate stations between which workpieces are advanced intermittently;
sensing means associated with said stations and having first and second positions corresponding respectively to the presence or absence of a workpiece at the associated station;
a transfer slide movable along said series of stations;
an actuator for moving said slide in forward feeding and reverse idle strokes;
individually movable work feed devices carried by said slide for movement thereon between a feed position in which the devices effect feeding movement of associated workpieces upon feeding movement of said slide and an idle position in which said devices leave the associated workpieces at rest during feeding movement of said slide;
means responsive to the presence or absence of workpieces at each station to ensure that at the next forward movement of said slide, the position of the feed device associated with the workpiece to the rear of the foremost empty station and all feed devices to the rear thereof are in their feed positions;
said means comprising a series of members independently movable between feed and idle positions, each of said members being operatively connected to one of said feed devices and operable to ensure that when one of said members is moved to its feed position the associated feed device occupies its feed position;
means for effecting relative movement between all of said members and said sensing means, said members if in idle position being engageable upon such relative movement with sensing means at empty stations to move said members to feed position;
said members having rigid abutting portions acting directly between said members operable to ensure that when any one member is moved from idle to feed position, all members to the rear of said one member occupy feed position while all members ahead of said one member continue to occupy idle position.

22. A system as defined in claim 21 in which said mechanical connections also ensure that when any member is moved from feed to idle position, all members ahead of said last mentioned member occupy idle position while all members to the rear of said last mentioned member continue to occupy feed position.

23. A system as defined in claim 21 in which said members are rigid elongated members positioned in general alignment with the series of stations, and said abutting portions are the ends of said members.

24. A system as defined in claim 23 in which said members are individually mounted on parallel links.

25. A system as defined in claim 21 in which the means for effecting relative movement between all of said members and said sensing means comprises a carrier movable along said series of stations.

26. A system as defined in claim 21 in which the means for effecting relative movement between all of said members and said sensing means comprises a control bar movable independently of said transfer slide.

27. A system as defined in claim 21 in which said feed devices each comprises an overcenter device biased by gravity to remain in whichever of its two positions it occupies.

28. A system as defined in claim 21 in which the operative connection between each of said members and its associated feed device is a one-way abutment between rigid portions thereof.

29. A system as defined in claim 21 in which said feed device comprises dogs engageable with the workpieces and operable to push them from station to station.

30. A system as defined in claim 29 in which said dogs are returned to idle position by engagement with workpieces when traversing occupied stations during the reverse idle stroke of said transfer slide.

31. An accumulating feed system comprising a series of work support stations including a starting station at which workpieces are deposited serially, a delivery station from which workpieces are removed serially, and a plurality of uniformly spaced intermediate stations between which workpieces are advanced intermittently, movable rigid sensing elements associated with said stations each having two positions corresponding to the presence or absence of a workpiece at the associated station and including an actuating portion movable between idle and actuating positions upon movement of said element, a transfer slide movable along said series of stations, means for reciprocating said slide in forward feeding and reverse strokes, a work transfer device for each station except the delivery station, and operable when activated to be moved by said transfer slide on forward feeding movement thereof to transfer a workpiece from its associated station to the station next ahead thereof, and means for controlling activation of said work transfer devices in accordance with the positions of said sensing means comprising a series of members disposed along said series of stations at intervals substantially equal to the spacing between said stations, said members being supported for like back and forth movement of the same sense between limiting positions which determine activation or nonactivation of the associated work transfer device, each of said members being independently and selectively movable between said limiting positions as a consequence of the position of the sensing element, each intermediate one of said members having one way engagement with one of the next adjacent members to effect movement thereof in the same sense as movement of said one intermediate member when said one intermediate member and said one next adjacent member occupy like positions prior to such movement, and having one way engagement with the other of the next adjacent members to effect movement thereof upon movement of said one intermediate member in the opposite sense when said one intermediate member and said other next adjacent member occupy like positions prior to such last mentioned movement.

32. A system as defined in claim 31 in which said members comprise a series of aligned elongated members in end abutment when occupying like positions.

33. A system as defined in claim 33 in which the back and forth movement of said members include components extending along said series of stations.